March 11, 1969   R. L. GARWIN   3,432,768
LASER DEVICE FOR PRODUCING MULTIPLE FREQUENCY OUTPUTS
Filed June 26, 1964
FIG. 1
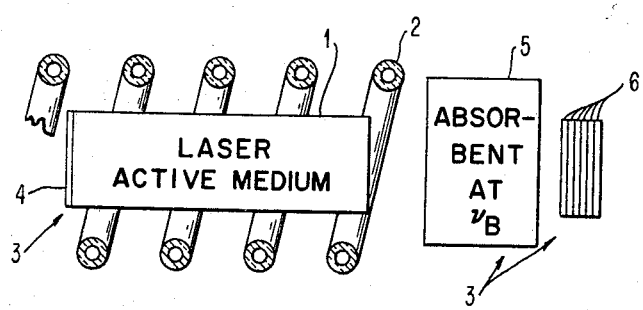
FIG. 2
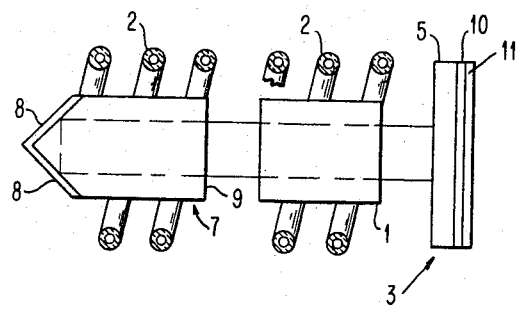
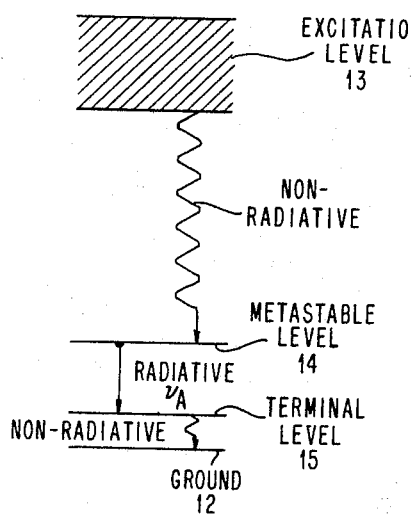
FIG. 3
*INVENTOR.*
RICHARD L. GARWIN
BY
*Thomas J. Kilgannon Jr.*
ATTORNEY

RELATIVE TRANSITION PROBABILITY A $\omega A/\omega B$

United States Patent Office

3,432,768
Patented Mar. 11, 1969

3,432,768
LASER DEVICE FOR PRODUCING MULTIPLE FREQUENCY OUTPUTS
Richard L. Garwin, Scarsdale, N.Y., assignor to International Business Machines Corporation, New York, N.Y., a corporation of New York
Filed June 26, 1964, Ser. No. 378,372
U.S. Cl. 331—94.5
Int. Cl. H01s 3/00
14 Claims

ABSTRACT OF THE DISCLOSURE

The invention relates to a laser device which is capable of providing output at at least two different frequencies, the sum of which is equal to the characteristic frequency of a particle within a laser active medium which has a forbidden single quantum transition.

---

The coherent light output from optically pumped solid-state lasers in the form of intense, sharp, single pulses is commonly referred to as a giant pulse because their peak intensity is greatly in excess of the peaks of the normally emitted light from a laser which has been pumped beyond threshold. While the normal output of a laser has a duration of several hundred nanoseconds, the giant pulse variety produces sharp, intense spikes of coherent light which have durations of some tens of nanoseconds. A number of well-known techniques for producing giant pulses can be found in the literature. In one usual case, an electro-optical shutter is interposed between a totally reflecting surface and the end of the active material of a laser. The generation of a giant pulse is initiated by closing the shutter and applying a pulse to an energizing lamp which surrounds the laser material. When the population inversion required for normal laser oscillation is greatly exceeded (the feedback loop is open due to the fact that the electro-optical shutter is closed), the shutter is opened and regeneration occurs at a high rate because of the abnormally high gain in the material. Energy which has been stored in the laser is released practically instantaneously and a high peak-power transient occurs resulting in the well-known giant pulse output. More recently, techniques have been disclosed which show the utilization of Kerr cells for Q switching to produce giant pulses. Other techniques incorporating Q-switching using special Q-switching elements have also been disclosed, but the basic mechanism for producing giant pulses in lasers of this type remains the same.

In a more recent article in the IBM Journal of Research and Development, volume 8, number II, April 1964, an article by P. P. Sorokin and N. Braslau, titled "Some Theoretical Aspects of a Proposed Double Quantum Stimulated Emission Device," another technique for producing giant pulses is disclosed. In this article, a coherent light generator making use of double-quantum stimulated emission is discussed. In the arrangement disclosed, a laser crystal having conventional laser geometry is doped with two fluorescent ions A and B. The A and B ions of this arrangement bear a relationship to each other such that the frequency of the laser light generated by the A ion when multiplied by two falls within the spontaneous emission line width of a B ion fluorescent transition which can be inverted by the action of the same energizing lamp which acts on the A ions. A relationship is further established such that $\nu_B = 2\nu_A$ where $\nu_B$ = the frequency of the B ion, and
$\nu_A$ = the frequency of the A ion.

Another criterion is that lasing action does not take place at $\nu_B$. This criterion can be satisfied by providing a low cavity Q at frequency $\nu_B$, by strong parasitic absorption in the laser material near frequency $\nu_B$ or preferably by a choice of ion such that the transition $\nu_B$ is highly forbidden to a single-quantum process. In addition to the article referred to above, subject matter related to the present application is disclosed in a copending patent application, entitled "Multiple Photon Laser," filed on behalf of Peter P. Sorokin on Apr. 10, 1964, having the Ser. No. 358,733, and assigned to the same assignee as the present application.

The device of the article is energized by a flash lamp which pumps both the A and B ions, inverting the population of these ions, and by providing a high cavity Q at frequency $\nu_A$. Oscillations occur at this frequency and the characteristic output of an optically pumped four-level solid-state laser is obtained. Large photon populations are thus sporadically produced in certain modes having frequencies which lie near the peak $\nu_A$ of the A-ion fluorescence. No stimulated emission involving the inverted B ion population can occur because of the low Q conditions established for $2\nu_A$, but if the photon density becomes large enough in one of the modes coherently excited by the A ions, the cross section becomes appreciably large for a double quantum transition in which a B ion is de-excited and two photons are simultaneously added to the mode which lies near peak $\nu_A$ of the A-ion fluorescence. Since the cross section for this process continues to increase with the addition of more photons to the aforementioned mode, an avalanche effect producing the required photons can occur resulting in a giant pulse at the $\nu_A$ frequency. The pulse then continues until the population excess of B ions is largely reduced.

In the above mentioned article, the relationship between the A ion frequency and the B ion frequency is shown to be $\nu_B = 2\nu_A$, and an output at frequency $\nu_A$ is provided. A high Q is established for frequency $\nu_A$, in one instance, by applying highly reflective coating at frequency $\nu_A$ to the end of the laser; by applying highly transmissive coating at frequency $\nu_B$ on the end of the laser and by doping the laser active material with a B ion having a two-photon transition at a frequency $2\nu_A$. In the present application, it will be shown that giant pulses at a frequency $\nu_A$ can be obtained in addition to other giant pulses at at least another different frequency such that $\nu_A + \nu_C = \nu_B$. In other words, it will be shown that other relationships can be derived from systems which exhibit multiple quantum stimulated-emission phenomenon. Certain structural criteria must be met, however, which will be discussed hereinbelow which permit the generation of intense, sharp coherent light pulses at two frequencies.

It is therefore an object of this invention to provide a laser employing the principle of multiple quantum stimulated emission which is an improvement over prior art devices.

Another object is to provide a laser which is capable of producing giant pulses of coherent light at more than one frequency.

Another object is to provide a laser device which is capable of producing giant pulses at more than one frequency; the outputs having a relationship $\nu_A + \nu_C = \nu_B$.

Yet another object is to provide a laser device which is capable of simultaneously producing high peak-power pulses at at least two different frequencies.

Still another object is to provide a laser device in which stimulated emission takes place at a priming frequency and at at least another frequency different from the priming frequency.

Another object is to provide a laser which makes available high intensity laser outputs in a new short wavelength range.

A feature of this invention is the utilization of a laser active medium containing at least a single group of particles capable of entering an excited state from which de-excitation occurs as a multiple photon transition and in which apparatus associated with the laser active medium produces stimulated emissions at at least two frequencies and at least a two-photon transition at frequencies whose sum is the characteristic frequency separation between the excited state and a lower state.

Another feature of this invention is the utilization of a laser active medium containing at least two groups of particles at least one of which is capable of entering an excited state from which de-excitation occurs as a multiple quantum transition which is energized to produce stimulated emission at two frequencies and at least a two photon transition at a sum frequency which is characteristic of one of the groups of particles.

Another feature of this invention is the utilization of a laser active medium containing at least a single group of particles capable of entering an excited state from which de-excitation occurs as a multiple photon transition which incorporates an excitation lamp and a reflective element optically coupled to the output of the laser active medium to reflect a broad band of frequencies; the reflective element providing a high Q to the stimulated emission frequencies which result from the double-quantum emission phenomenon.

Yet another feature of this invention is the utilization of a laser device having a two photon transition and first and second stimulated frequency components the laser device being characterized by a surface which is reflective of a band of frequencies including both the first and second stimulated emission frequency components.

The foregoing and other objects, features, and advantages of the invention will be apparent from the following more particular description of preferred embodiment of the invention as illustrated in the accompanying drawings.

In the drawings:

FIG. 1 is a schematic illustration showing an aspect of the invention utilizing a laser active medium which includes certain semiconductors, glasses, liquids, gases and insulators.

FIG. 2 is a schematic illustration showing an embodiment of the invention utilizing a laser active material containing a single group of particles and a source of priming photons disposed externally of the laser material.

FIG. 3 is an energy level diagram which indicates the various transitions an excited particle undergoes in passing from an excited state to its normal ground state.

Figure 4:
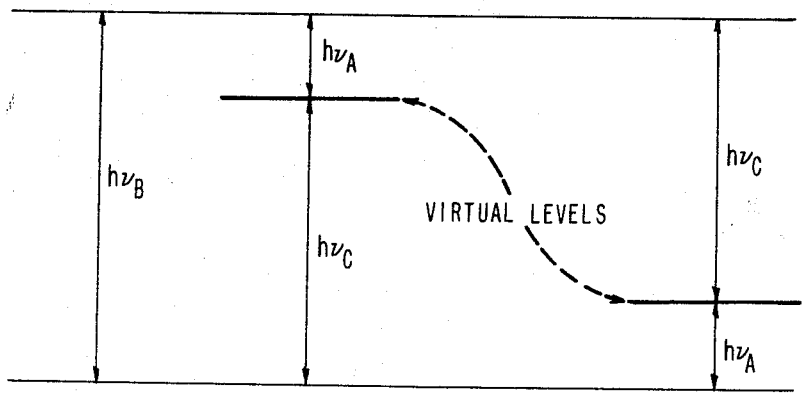
FIG. 4 is an energy level diagram for a laser exhibiting the double quantum transition phenomenon.

The novel features of the present invention arose from the recognition that, theoretically, no restraint need be placed on the relationship between $\nu_A$ and $\nu_B$. The concept that the giant pulse outputs of a laser at two frequencies as defined by the relationship $$\nu_B = \nu_A + \nu_C$$

gives wider application to the double-quantum stimulated emission phenomenon as set down in the above mentioned article wherein the relationship that $$\nu_B = 2\nu_A$$

was set forth for obtaining a giant pulse output.

The criterion that the B-ion frequency $\nu_B$ be twice the A-ion frequency does not have to be adhered to except in the special case where a maximum power pulse at a single frequency is required. The novelty of the present invention resides in certain structural features which distinguish it over both the prior art and devices suggested by the above mentioned article. The novel structural features; functions and results of this invention are detailed in the following discussion;

In FIG. 1, a laser active medium 1 is shown surrounded by energizing flash lamp 2. Laser active medium 1, in its broadest aspect, is a cavity resonant at frequencies $\nu_A$ and $\nu_C$ which contains $N_a$ ions per cc. of type A and $N_b$ ion per cc. of type B in a host material. Thus, laser active medium 1 could be any one of a number of solid, liquid, or gaseous materials containing ions, atoms or molecules with narrow electronic energy levels which provide light amplification by stimulated emission of radiation. Such ions, atoms, and molecules of type A can be defined as particles capable of entering an excited state from which de-excitation occurs as a single quantum transition, while type B can be defined as particles capable of entering an excited state from which de-excitation occurs as a multiple quantum transition. Thus, where reference is made hereinafter to an A particle or a B particle, it should be understood that such particles include atoms, ions, and molecules. As is well known, certain glasses appropriately doped, as well as insulators and semiconductor materials are included among the materials which provide stimulated emission light outputs. It should also be appreciated that energizing flash lamp 2 is not the only means for inverting the ion populations present in laser active media. In FIG. 1 a flashlamp 2 has been shown for purposes of explanation but, depending upon the type of laser active medium, any other means of population inversion can be utilized in the practice of this invention. A chemical reaction which provides products in states of electronic excitation might prove most appropriate where the laser active medium is a gas. Population inversion may also be obtained electrically by means of a discharge through a gaseous medium or by carrier injection where solid state semiconductors are utilized.

A detailed analysis to be disclosed hereinafter shows that laser active medium 1 may be primed at frequency $\nu_A$ with a number of photons small compared with $N_B$ and will provide giant pulses simultaneously at $\nu_A$ and $\nu_C$ in accordance with the relationship that $\nu_B = \nu_A + \nu_C$.

The relaxation of the requirement that $\nu_B = 2\nu_A$ allows the use of metastable levels $\nu_B$ such that $\nu_B$ is very much greater than $\nu_A$ (in excess of $2\nu_A$) and makes available high-intensity laser outputs in a new short-wave length range; allows the production of new laser lines rather than amplification of known ones and eases substantially the problem of designing a system which exhibits the unique high output power characteristics of the multiple photon laser.

Referring again to FIG. 1, laser active medium 1 has a filter element 3 optically coupled to the ends thereof. Element 3 may be deposited directly on the ends of laser active medium 1 or may be spaced from the ends without changing its function in any way. Filter element 3 may assume two configurations; both of which are shown in FIG. 1. At the left hand of laser active medium 1, filter element 3 consists of a reflecting layer 4 which has a broad band reflection capability such that it is simultaneously reflective at frequencies $\nu_A$ and $\nu_C$. Layer 4 further has the property of being transmissive at the B particle frequency. At the right hand end of medium 1, filter element 3 consists of an absorbing medium 5 interposed between medium 1 and a plurality of reflecting layers 6 which are reflectors at frequencies $\nu_A$ and $\nu_C$, respectively. Absorbing medium 5 is absorptive at the B particle frequency and causes a low cavity Q at the B-particle frequency. The reflecting layers 6 each have individual characteristics such that a peak reflectivity is attained at frequencies $\nu_A$ and $\nu_C$. In general, filter element 3 may consist of layers of dielectric material having narrow or broad pass and stop characteristics or may be metallic reflectors or other arrangements well known to those skilled in the optics art as long as a high Q is simultaneously present at frequencies $\nu_A$ and $\nu_C$.

Laser active medium 1 in FIG. 1, which may be, for example, calcium fluoride doped with divalent thulium and dysprosium acting as the A and B ions, respectively, operates in the following manner. Flash lamp 2 surrounding laser active medium 1 is triggered from a source not shown. The energy supplied from flash lamp 2 pumps both the A and B particles present in laser active medium 1 causing a population inversion of each of the particles. The A and B particles are thus removed from their normal ground state by addition of energy from flash lamp 2. The particles are elevated to a higher energy level at which they are relatively unstable and from which they tend to return to their normal stable ground state. In returning to the normal ground state, considering for a moment only the A particles, energy is given up and stimulated emission at the A particle frequency occurs provided oscillations within medium 1 have been attained by reflections from filter element 3 at the A particle frequency. Pulses of light characteristic of optically pumped solid state lasers are then emitted at frequency $\nu_A$.

Considering now what happens to the B particles, it should be recalled that filter element 3 is highly transmissive or absorptive at the B-particle frequency. Under such circumstances, oscillations will not occur and there is no stimulated emission at the B-particle frequency. Large photon populations, however, are available due to the presence and stimulated emission of the A particles. There is also a considerable population available at frequency $\nu_C$. The laser active medium 1 of FIG. 1, it should be recalled, is reflective or has a high-cavity Q at frequency $\nu_C$. Because of the low cavity Q due to the transmissivity or absorptivity at the B-particle frequency, no stimulated emission at that frequency occurs, but a condition is created such that if the photon density becomes large enough, the possibility for the occurrence of a double-quantum transition (also called a two-photon transition) in which the B particle is de-excited and in which two photons are added to the system increases. Since the probability for the occurrence of a double quantum transition increases with the addition of more photons to the system, an avalanche effect is produced by the addition of the photons and a giant pulse results at frequencies $\nu_A$ and $\nu_C$, the summation of which is equal to the B-particle frequency, $\nu_B$.

In FIG. 2, another laser device incorporating a laser active medium 1 containing only a single group of particles, B particles, for instance, is shown. Laser active medium 1 may be a single-crystal material, for instance; which is appropriately doped with B-type particles. Also shown are means for energizing the laser device to produce stimulated emission at at least two frequencies and a two photon transition at frequencies the sum of which is the characteristic frequency separation between the excited state and a lower state. Included in the above mentioned means is an excitation lamp 2 surrounding laser active medium 1 and a conventional laser device 7 of a host material doped with appropriate A particles also surrounded by excitation lamp 2. Laser device 7 has two total internal reflective surfaces 8 at one end thereof and another end 9 which is untreated. A filter element 3 is shown disposed adjacent the right hand end of laser active medium 1. Filter element 3, as in FIG. 1, may consist of a broadband reflecting layer which is reflective at $\nu_A$ and $\nu_C$ and transmissive at frequency $\nu_B$ or may consist of separate reflecting layers 10, 11 for each of the frequencies $\nu_A$ and $\nu_C$, respectively, in addition to an absorbing medium 5 which is highly absorptive at $\nu_B$. The system of FIG. 2 is similar to an embodiment disclosed in the aforementioned copending application with the exception that the reflective layers of filter element 3 are reflecitve at two different frequencies rather than one. In the arrangement disclosed in the copending application, priming photons at the A-particle frequency are provided from a laser which operates in the usual well-known manner. The B particles (chromium) in a ruby crystal have a frequency which is twice the A-particle frequency. The B particle has a forbidden single-quantum transition, and decay from the metastable state occurs as a double-quantum or two-photon transition. The presence of the photons resulting from the two-photon transition causes an avalanche effect and a giant pulse at the priming frequency $\nu_A$ results. In FIG. 2, laser active medium 1 can be doped with B particles which have a transition frequency other than twice the priming frequency. The B-particle frequency may be chosen by careful selection of the host crystal, the B particles and reflective layers which present a high-Q to frequencies $\nu_A$ and $\nu_C$. Thus, rather than doping aluminum oxide with chromium to provide the energizing particle and using a neodymium doped glass to provide the triggering particles, a system in which the energizing particle is not at twice the triggering particle frequency may be used. One such system consists of calcium fluoride doped with divalent thulium as the energizing B ion and a silicate glass doped with trivalent holmium as the source of triggering A ions. The difference between the priming frequency and the B-particle frequency would be the frequency at which one layer of filter element 3 would be made reflective, the other being reflective at the priming frequency.

In operation, the laser device of FIG. 2 provides a giant pulse output at the priming frequency and at a frequency which is different from the priming frequency. In FIG. 2, excitation lamp 2 which may consist of one or more flash lamps pumps both the A particles in laser device 7 and the B particles in laser active medium 1 from their normal ground state 12, as shown in FIG. 3, to an excitation level 13 causing a population inversion of both types of particles. In laser device 7, the triggering A particles drop from excitation level to a metastable state or level 14 as shown in FIG. 3 in a non-radiative transition and from the metastable state to the terminal state 15 in a radiative transition at frequency $\nu_A$ and, finally from the terminal level 15 to ground state 12 in a nonradiative transition. The B particles in laser active medium 1 are also pumped to some excitation level, but because a single quantum transition is forbidden, the particles cannot decay to their natural ground state in the same manner as the A particles. In the meantime, photons at frequency $\nu_A$ are being supplied to laser active medium 1 by laser device 7 increasing the probability of occurrence of a double quantum transition. It should be recalled that the nonreflecting or absorptive property of filter 3 prevents any build up of oscillations at the B particle frequency. Finally, enough particles are being supplied to the laser active medium 1 such that an avalanche effect occurs due to the double-quantum emission phonomenon. Energy stored in laser active medium 1 is then rapidly converted in radiative transitions into coherent light outputs at frequencies $\nu_A$ and $\nu_C$ in the form of simultaneous giant pulses. The energy diagram of FIG. 4 shows the relationship between $h\nu_A$, $h\nu_B$, and $h\nu_C$. The fact that $h\nu_A$ and $h\nu_C$ are shown having different energy levels is indicative of the fact that for any energy level $h\nu_B$, there are a number of possible transitions depending on the priming frequency which can produce giant pulses at $\nu_A$ and $\nu_C$.

The virtual levels shown in FIG. 4 exist only in the presence of priming photons at frequency $\nu_A$. The system behaves as if there were a population of real particles with energy levels differing by $h\nu_A$ from the original levels but having a concentration proportional to $KN_bS_a$ where $N_b$=the number of ion/cc. of type B,
$S_a$=the cavity populations of photons at frequency $\nu_A$.

The analysis which follows makes no specific use of these virtual levels, but their apparent presence in the system may be helpful in understanding the physics of the system.

Figure 5:
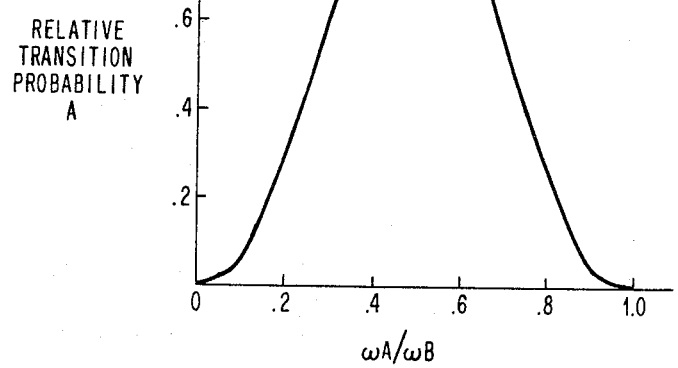
FIG. 5 is a plot of the Relative Transition Probability vs. $\omega_A/\omega_B$ showing the probability for the occurrence of a two photon transition.

While it is theoretically possible to define the relationship $$\nu_B = \nu_A + \nu_C$$

as a practical matter, it should be appreciated that the probability for a two photon process is broadly resonant at $\nu_A = \nu_C$ and falls off to zero where either $\nu_A$ or $\nu_C$ is greater than $\nu_B$. FIG. 5 which is a plot of relative transition probability vs. $\omega_A/\omega_B$ shows the probability for the occurrence of a two photon process. Note that where $\omega A/\omega B$ is equal to 0.5 that the relative transition probability A is a maximum. This is the case suggested by the article referred to hereinabove where $\nu_B$ is equal to $2\nu_A$.

Figure 6:
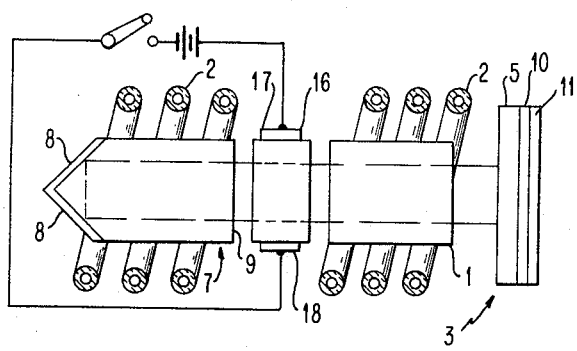
FIG. 6 is a schematic illustration of an embodiment of this invention which utilizes Kerr-cell Q-switching to provide a giant pulse at frequency $\nu_A$ to prime a laser active medium containing a single group of particles.

A Q-spoiling technique utilizing a Kerr cell is shown in FIG. 6 along with the arrangement of FIG. 2. The arrangement of FIG. 6 operates in the same manner as the device described in connection with FIG. 2 with the exception that a Kerr cell 16 is interposed between laser 7 and laser active medium 1. Kerr cell 16 is adapted to cut off or transmit polarized light in response to the switching of an electrical potential across the electrodes 17, 18 of such a cell. The use of a Kerr cell produces a giant pulse output from laser device 7 thereby enhancing the triggering conditions which produce the giant pulses at two different frequencies.

Figure 7:
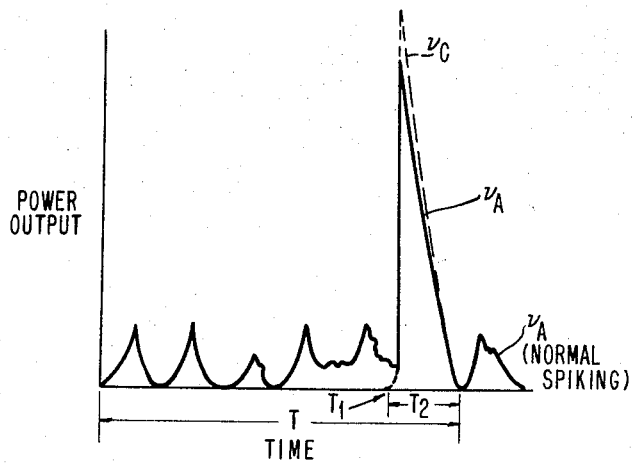
FIG. 7 is a plot of energy vs. time showing the relative timing of events during the production of a giant pulse.

In FIG. 7, a plot of Power Output vs. Time is shown to indicate the relative timing of the production of giant pulses. Assume that time begins with the triggering of the excitation of the flash lamp surrounding the laser, and that laser action takes place almost immediately. This lasing action is due to the presence of the A particles and continues during the whole of the given cycle either as a normal laser output or in the form of a giant pulse. The given cycle terminates when the population excess of B particles is largely reduced. Thus, the normal laser spikes at a relatively low power level are produced during the major portion of the given cycle T. At some time $T_1$, a high energy pulse of light having a very fast rise time occurs simultaneously at frequencies $\nu_A$ and $\nu_C$ and remains for a minor portion of the given cycle $T_2$. The high energy pulse at $\nu_C$ may have a higher or lower amplitude than that at $\nu_A$ depending on its frequency which in turn determines its energy level. Recalling that the summation of the frequencies $\nu_A$ and $\nu_C$ equal the frequency $\nu_B$, it is interesting to note that the summation of the energies in the two simultaneous pulses at $\nu_A$ and $\nu_C$ is equal to the power output at a single frequency $\nu_A$ in the above mentioned article.

It is possible, therefore, to change the power output of a laser active medium by changing its frequency which is in turn dependent on the B-ion doping, the priming frequency and the Q of the laser cavity.

The following discussion will, it is believed, provide a valid theoretical basis for the teaching that under the proper conditions, giant pulses can be obtained from a laser device at two frequencies such that $$\nu_A + \nu_C = \nu_B$$

Referring again to the above mentioned article, "Some Theoretical Aspects of a Proposed Double Quantum Stimulated Emission Device," by P. P. Sorokin and N. Braslau, calculations were outlined utilizing Equations 1 through 19 which provided the mathematical basis for devices which utilize the two photon transition phenomenon in the case where $\nu_B = 2\nu_A$.

In the present application, Equations 1 through 13 of the Sorokin, Braslau article establish the following rate equations:

$$\frac{dS_C}{dt} = B_1 S_C S_A N_B - \frac{S_C}{\tau} \quad (1)$$

$$\frac{dS_A}{dt} = B_1 S_C S_A N_B - \frac{S_A}{\tau} \quad (2)$$

$$\frac{dN_B}{dt} = -B_1 S_C S_A N_B \quad (3)$$

in which $S_A$ and $S_C$ are the cavity populations of photons of frequency $\nu_A$ and $\nu_C$ respectively. The cavity decay-time $\tau$ is assumed common for the two sets of photons, and the two-photon coupling constant $B_1$ is $$B_1 = \frac{3}{4} \frac{C^2 \sigma_1}{V^2 M r^2}$$

where $C$=speed of light in cm. second,
$\sigma_1$ is a coefficient expressing the strentgth of two-photon absorptive processes,
$V$=volume in cubic centimeters,
$Mr$ is the refractive index of the medium.

The behavior of the multiphoton laser is simply treated in three time regimes: (I) exponential growth of the minority photon population; (II) giant pulse, during which $S_A$ and $S_C$ grow together and $N_B \to 0$; (III) Decay. Regimes II and III shall be discussed first, and then the priming requirements will be defined.

*Regime II.—Development of the giant pulse*

In this regime $S_A \approx S_C \equiv S$, and the terms in $1/\tau$ are negligible. Thus Eqs. 1 and 2 above become $$\frac{dS}{dt} \approx B_1 S^2 N_B \approx -\frac{dN_B}{dt} \quad (4)$$

which indicates a maximum logarithmic growth rate $$\frac{1}{S}\frac{dS}{dt}\bigg|_{\max} \approx B_1 S N_B(0) \approx B_1 N_B(0)^2$$

which may far exceed the logarithmic growth rate of a conventional giant pulse laser, Eq. 4 would yield the solution $$\frac{1}{S_0} - \frac{1}{S} = B_1 N_B t$$

showing that the giant pulse total growth time is on the order of $1/S_0 B_1 N_B$ seconds.

Figure 8:
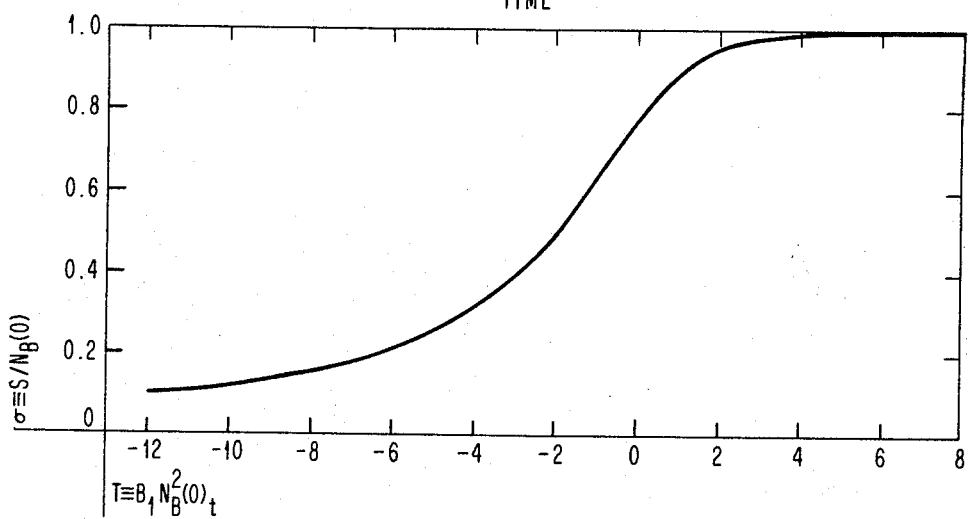
FIG. 8 is a plot of the number of photons of either frequency $\nu_A$ or $\nu_C$ as a function of time in the development of the giant pulse.

Putting $\sigma \equiv S/N_B(0)$, $T \equiv B_1 N_B^2(0)t$, $S_A = S_C \equiv S$, and remembering that $N_B(t) = N_B(0) - S$, Equation 3 becomes $$\frac{d[N_B(0)(1-\sigma)]}{d\left(\dfrac{T}{B_1 N_B^2(0)}\right)} = -B_1 N_B^2(0)\sigma^2[N_B(0)(1-\sigma)]$$

or $$\frac{d(1-\sigma)}{dT} = -\sigma^2(1-\sigma) \quad (3')$$

or $$\frac{d\sigma}{dT} = \sigma^2(1-\delta) \quad (5)$$

with the indefinite integral $$\frac{-1}{\sigma} - \ln\left(\frac{1}{\sigma} - 1\right) = T$$

giving rise to the plot of FIG. 8.

From the parameters given in the Sorokin-Braslau article $N_B = 2 \times 10^{18}$, and $B_1 = 3.6 \times 10^{-25}$ sec.$^{-1}$, the time unit $(B_1N_B{}^2(0))^{-1}$ is found to be $0.7 \times 10^{-12}$ sec., and from FIG. 8 it is seen that $$\left(\frac{1}{S}\right)\frac{dS}{dt}\bigg|_{max} \approx \frac{B_1N_B{}^2(0)}{4} \approx 3 \times 10^{11} \text{ sec.}^{-1}$$

Such enormous rates of change of population justify the neglect of the $1/\tau$ terms in this growth regime. say, $S_A \approx S_B \approx N_B e^{t-\tau}$.

Regime III.—Decay

As has been shown, the growth of the photon population and the de-excitation of all of the ion inverted population occurs in a time much less than the cavity decay-time $\tau$. Thus the regime III is simply an exponential decay, $S_A \approx S_B \approx N_B e^{t-\tau}$.

Regime I.—Priming conditions

*Method I.*—The priming criteria require some special discussion. It is assumed that the laser is primed with a substantial population $S_A(0)$ of photons $\nu_A$. The condition for growth of the $\nu_C$ population, according to Eq. 1, is $$B_1 S_A(0) N_B > \frac{1}{\tau} \quad (7)$$

or $$S_A > S_0 \equiv \frac{1}{B_1 N_B \tau} \quad (8)$$

which is identical with Eq. 17 shown in the Sorokin-Braslau article except for a trivial factor of 2. Thus if (7) is well satisfied, $S_C$ will grow exponentially with a time constant $1/B_1 S_A N_B(0)$ until $S_C$ is no longer small compared to $S_A$. More precisely, one scheme for priming is to fill the cavity to a level $S_A(0)$ satisfying (8), and to allow the $\nu_A$ population to decay freely while the $\nu_C$ population grows. The condition that $S_C \approx S_A$ before $S_A$ decays below the critical level (8) is thus readily seen to be $$\frac{S_A(0)}{S_0} \geq \ln\left(\frac{S_0}{1}\right) \quad (9)$$

(considering the initial "spontaneous" emission from the $[N_B + S_A(0)]$ system into the $\nu_C$ mode as being induced by the zero-point energy of the vacuum).

Strictly speaking, unless $S_C \gg 1$, Eq. 1 should be written $$\frac{dS_C}{dt} = B_1 S_A N_B (S_C + 1) - S_C/\tau$$

i.e.

$$\frac{dS_C}{dt} = B_1 S_C S_A N_B - S_C/\tau + B_1 S_A N_B$$

The last term represents spontaneous emission and is included in the above analysis by starting with $S_C = 1$.

Eq. 9 is obtained as follows: In the priming phase of Method I we have $$S_A(t) = S_A(0) e^{-t/\tau} \quad (9a)$$

and $$\frac{dS_C}{dt} = \frac{S_A(t)}{S_0}\frac{S_C}{\tau} - \frac{S_C}{\tau} = \frac{S_C}{\tau}\left[\frac{S_A(0)}{S_0}e^{-t/\tau} - 1\right] \quad (9b)$$

which integrates directly to $$\ln\left[\frac{S_C(t)}{S_C(0)}\right] = \frac{S_A(0)}{S_0}(1 - e^{-t/\tau}) - \frac{t}{\tau} \quad (9c)$$

which for $S_C(0) = 1$, and $S_A(0)/S_0 \gg t/\tau \gg 1$, gives Eq. 9.

Thus, Method I requires an initial priming photon density about 30 times as great as is necessary for the degenerate two-photon laser of the Sorokin-Braslau article.

*Method II.*—An alternative to Method I is to supply priming photons $\nu_A$- over a period of several cavity decay times. The total number of photons $\nu_A$ and the corresponding supply time required for reaching Regime II can thus be calculated. The result is that the number is a minimum for instantaneous supply as in Method I and is $$S_{min} \approx S_0 \ln S_0 \quad (10)$$

but that the total number of priming photons required does not increase by much so long as one pumps well over the threshold (8). Thus, $2S_0 \ln S_0$ expresses the number of $\nu_A$ photons required if one maintains a photon level $2S_0$ in the cavity for a time $\tau \ln S_0 \approx 10^{-7}$ sec., using the parameters set down in the Sorokin-Braslau article. Normal laser spikes exceed $10^{-7}$ seconds in duration, so that the nondegenerate two-photon laser can be primed by the same photon source which would be adequate for the degenerate case.

Figure 9:
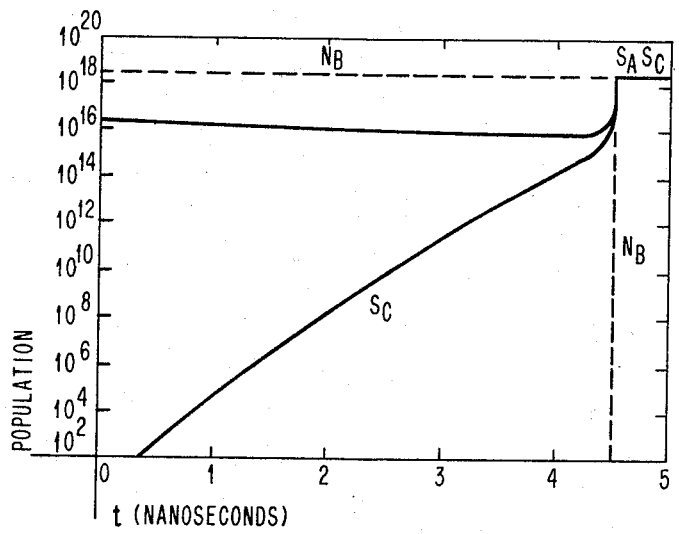
FIG. 9 is a plot of population vs. time showing the course of events in the nondegenerate two-photon laser of this system.

FIGURE 9 shows the course of the various populations as a function of time, using Method I for priming whereas FIGURE 8 shows the steep region of the pulse on a time scale expanded $\sim 10^4$ times at the time in FIGURE 9 where the populations $S_C$ and $S_A$ are equal.

In FIG. 9, the change of population of the photon populations $S_C$ and $S_A$ with time is shown. Note that the population of B ions $N_B$ remains constant until the populations of photons $S_C$ and $S_A$ both exceed the threshold value $S_0$. At that point, the B ion population $N_B$ decays substantially instantaneously and the photon populations $S_A$ and $S_C$ rise substantially instantaneously to the former value of the B ion population. It should also be noted that the time for the population $S_C$ to approach the same population as $S_A$ is relatively long compared to the time required for the onset of the giant pulse once $S_A$ and $S_C$ have reached the same value. This indicates that relative to the devices shown in the Sorokin-Braslau article somewhat more power is required by the system of Method I to obtain giant pulses.

The predicted performance of a non-degenerate two-photon laser has been briefly analyzed indicating the very high logarithmic-growth-rate of the two-quantum laser. Normal Q-switched lasers are limited in growth rate by the condition that the cavity in the low-Q status be stable against the exponential growth of population in the resonant modes. Thus, if the cavity time constant is switchable between $\tau/q$ and $\tau$, the above condition requires the build-up time in the absence of loss to be longer than $\tau/q$. For pink ruby, the Q-switched rise time has been shown to be about $2 \times 10^{-9}$ sec., about three orders of magnitude larger than the rise time calculated above for the two-photon laser.

As has been mentioned herein above, the teaching of this invention can be utilized in connection with solid, liquid or gaseous lasers. The type of laser is not significant so long as the probability for the occurrence of multiple photon transitions is large. In this connection, it should be appreciated that multiple photon transitions (i.e., more than two) can occur, but that the cross-secion or the probability for the occurrence of a multiple transition is small. One way of increasing the cross-section in a multiple photon transition system is to provide photons in the form of giant pulses from the devices of FIGS. 1, 2, and 6 as a priming frequency. In such an arrangement, only one of the giant pulses can be utilized to trigger a laser device containing particles capable of a multiple photon transition. The output would be the priming frequency plus one other frequency, the sum of the output frequencies being equal to the frequency of the particle having the multiple quantum transition capability. Where the laser device containing particles capable of multiple photon transitions is triggered by both giant pulse outputs from the devices of FIGS. 1, 2, and 6, it is possible to obtain outputs from the laser device at the two priming frequencies and at another frequency; the summation of these frequencies being equal to the frequency of the particle having a multiple photon transition.

While the invention has been particularly shown and described with reference to preferred embodiments thereof, it will be understood by those skilled in the art that various changes in form and details may be made therein without departing from the spirit and scope of the invention.

What is claimed is:

1. A laser device comprising a laser active medium containing at least a single group of particles capable of entering an excited state from which de-excitation occurs as a multiple quantum transition,
    means for exciting said at least said single group of particles during a given cycle,
    means optically coupled to said laser active medium reflective at at least two different frequencies and reflection-free at a frequency characteristic of said at least said single group of particles to produce stimulated emission at one frequency during said given cycle and stimulated emission at at least another frequency and at least a two photon transition during a portion of said given cycle.

2. A laser device comprising a laser active medium containing at least one group of particles capable of entering an excited state from which de-excitation occurs as a multiple quantum transition,
    means for exciting said at least said one group of particles, and
    means optically coupled to said laser active medium reflective at at least two different frequencies and reflection-free at a sum frequency characteristic of said at least said one group of particles.

3. A laser device according to claim 2 wherein said means for exciting said at least one group of particles includes a flash lamp optically coupled to said laser active medium.

4. A laser device according to claim 2 wherein said means for exciting said at least one group of particles includes at least another laser optically coupled to said laser active medium.

5. A laser device according to claim 2 wherein said means reflective at at least two different frequencies and reflection-free at a sum frequency characteristic of said at least one group of particles includes a filter reflective at said at least two different frequencies and highly transmissive at said sum frequency.

6. A laser device according to claim 2 wherein said means reflective at at least two different frequencies and reflection-free at a sum frequency characteristic of said at least one group of particles includes a filter reflective at said at least two different frequencies and highly absorptive at said sum frequency.

7. A laser device comprising a laser active medium containing at least two groups of particles at least one of which is capable of entering an excited state from which de-excitation occurs as a multiple quantum transition,
    means for exciting said at least said two groups of particles during a given cycle, and
    means optically coupled to said laser active medium reflective at at least two different frequencies and reflection-free at a frequency characteristics of said at least one of said two groups of particles to produce stimulated emission at one frequency during said given cycle and stimulated emission at at least another frequency and at least a two photon transition during a portion of said given cycle.

8. A laser device comprising a laser active medium containing at least two groups of particles at least one of which is capable of entering an excited state from which deexcitation occurs as a multiple photon transition,
    means for exciting said at least two groups of particles, and
    means optically coupled to said laser active medium reflective at at least two different frequencies and reflection-free at a sum frequency characteristics of said at least one of said at least two groups of particles.

9. A laser device according to claim 8 wherein said means for exciting said at least two groups of particles includes a flash lamp optically coupled to said laser active medium.

10. A laser device according to claim 8 wherein said means reflective at at least two different frequencies and reflection-free at a sum frequency characteristic of said at least one of said at least two groups of particles includes a filter reflective at said at least two different frequencies and highly transmissive at said sum frequency.

11. A laser device according to claim 8 wherein said means reflective at at least two different frequencies and reflection-free at a sum frequency characteristic of said at least one of said at least two groups of particles includes a filter reflective at said at least two different frequencies and highly absorptive at said sum frequency.

12. A laser device including
    an exciting source and a laser active medium optically coupled to said source capable of producing at least a two photon transition and at least first and second different stimulated frequency components characterized by a surface optically coupled to said laser active medium which is reflective of a band of frequencies including both said first and second stimulated emission frequency components.

13. A laser device including
    an exciting source and a laser active medium optically coupled to said source capable of producing at least a two photon transition and at least first and second different stimulated frequency components characterized by a surface optically coupled to said laser active medium which is reflective of a band of frequencies including both said first and second stimulated frequency components and which is reflection-free at the sum frequency of said first and second stimulated frequency components.

14. A laser device comprising a laser active medium containing at least a single group of particles capable of entering an excited state from which de-excitation occurs as a multiple quantum transition,
    means for energizing said laser active medium, and
    means optically coupled to said laser active medium for forming an optical cavity resonant at at least two different frequencies, the sum of which is equal to the characteristic frequency of said at least said single group of particles.

References Cited

McClung: "$R_2$ Line Optical Maser Action in Ruby," Journal of Applied Physics, vol. 33, No. 10, October 1962, pp. 3139–3140.

JEWELL H. PEDERSEN, *Primary Examiner.*

RONALD L. WIBERT, *Assistant Examiner.*